(12) United States Patent
Palmer et al.

(10) Patent No.: US 11,927,378 B2
(45) Date of Patent: Mar. 12, 2024

(54) SENSOR ASSEMBLY

(71) Applicant: ROLLS-ROYCE plc, London (GB)

(72) Inventors: Chloe J. Palmer, Derby (GB); Ian M. Bunce, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 18/057,270

(22) Filed: Nov. 21, 2022

(65) Prior Publication Data
US 2023/0175750 A1    Jun. 8, 2023

(30) Foreign Application Priority Data
Dec. 7, 2021   (GB) ...................................... 2117640

(51) Int. Cl.
*F25B 9/06* (2006.01)
*F25B 9/00* (2006.01)
*F25B 49/02* (2006.01)
*G01N 25/12* (2006.01)

(52) U.S. Cl.
CPC .............. *F25B 49/02* (2013.01); *F25B 9/008* (2013.01); *F25B 9/06* (2013.01); *G01N 25/12* (2013.01); *F25B 2309/061* (2013.01); *F25B 2600/2515* (2013.01)

(58) Field of Classification Search
CPC .. F25B 49/02; F25B 9/008; F25B 9/06; F25B 2309/061; F25B 2600/2515; G01N 25/12
See application file for complete search history.

(56) References Cited

U.S. PATENT DOCUMENTS 5,154,080 A * 10/1992 Hill ........................ G01S 15/08
73/612
2019/0086311 A1   3/2019 Nordstrom et al.

FOREIGN PATENT DOCUMENTS

| CN | 103115936 A | 5/2013 |
| CN | 108918683 A | 11/2018 |
| EP | 3246545 A1 | 11/2017 |
| JP | 2008180570 A2 | 8/2008 |

OTHER PUBLICATIONS

Great Britain search report dated Apr. 11, 2022, issued in GB Patent Application No. 2117640.9.
Popov, V. K. et al., "Acoustic and photoacoustic measurements in supercritical fluids; a new approach to determining the critical point of mixtures", The Journal of Supercritical Fluids, 1994, 7, pp. 67-73. DOI:10.1016/0896-8446(94)90042-6.
(Continued)

*Primary Examiner* — Nael N Babaa

(57) ABSTRACT

A sensor assembly is shown for sensing a crossing of the critical point in a system utilising a working fluid in a transcritical cycle passing through the critical point. A first broadband acoustic sensor is located upstream of a component and a second broadband acoustic sensor is located downstream of the component, each of which are arranged to detect high-frequency and low-frequency sounds caused by the crossing of the critical point. A flow regulation device regulates flow of working fluid through the component in response to the output of one or both of the first broadband acoustic sensor and the second broadband acoustic sensor, thereby adjusting the location of the crossing of the critical point.

17 Claims, 8 Drawing Sheets

(56) References Cited

OTHER PUBLICATIONS

Ke, J., et al., Detecting phase transitions in supercritical mixtures: an enabling tool for greener chemical reactions, DOI: 10.1098/rspa.2010.0267NPL: XP093041873, Oct. 8, 2010, Royal Society of London.
European search report dated Apr. 25, 2023, issued in EP Patent Application No. 22205967.7.

* cited by examiner

SENSOR ASSEMBLY

CROSS REFERENCE TO RELATED APPLICATIONS

This application claims priority from United Kingdom Patent Application Number 2117640.9 filed Dec. 7, 2021, the whole contents of which is incorporated herein by reference in its entirety.

BACKGROUND

Technical Field

This disclosure relates to a sensor assembly for detecting the critical point in a system utilising a supercritical working fluid. The disclosure also relates to a control system utilising such a sensor assembly and control methods utilising data from such a sensor assembly.

Description of the Related Art

A supercritical fluid is any substance at a temperature and pressure above its critical point, where distinct liquid and gas phases do not exist. An example includes carbon dioxide ($CO_2$), for which the critical temperature and pressure are 304 K and 7.38 MPa respectively. Supercritical carbon dioxide shall be referred to herein as $sCO_2$.

Turbines which operate on supercritical carbon dioxide ($sCO_2$) working fluid as part of a closed Brayton or Rankine cycle heat engine have many advantages. In view of the high density and high temperatures of supercritical $CO_2$, extremely compact and high efficiency turbomachinery can be provided.

Supercritical fluids may have advantageous thermodynamic properties such as extremely high thermal conductivity and extremely high specific heat capacity.

Accordingly, for example, it may be desirable to utilise supercritical fluids such as $sCO_2$ as cooling fluids in heat exchangers.

Measurable benefits of utilising a supercritical working fluid are only realised within a tight tolerance, i.e. at or very close to the critical point. For instance, in the case of $sCO_2$, it may be desired to operate within a tolerance of ±100 kPa of the critical pressure and ±1 K of the critical temperature, in order to achieve significantly increased thermodynamic performance.

It can be challenging to detect the critical point in a system utilising a supercritical working fluid. Precisely detecting the critical point can be important, because the properties, e.g. thermodynamic properties, of the supercritical working fluid change so quickly either side of the critical point. It is a further challenge to control a system to better utilise the beneficial properties of a supercritical working fluid.

Typically, there are a number of ways to sense conditions in a thermodynamic heat engine, including pressure sensors, temperature sensors, temperature sensors, mass flow meters and fluid velocity sensors.

However, due to the rapidly changing conditions near the critical point of a fluid, these sensors may not be accurate enough, may not be responsive enough or may be prohibitively expensive or invasive to the system.

SUMMARY

A first aspect provides a sensor assembly for sensing a crossing of the critical point in a system utilising a working fluid in a transcritical cycle passing through the critical point, the sensor assembly comprising:
  a component through which the working fluid flows, and, within a predetermined region of which the crossing of the critical point of the working fluid is desired to occur;
  a first conduit upstream of the component for conveying the working fluid to the component;
  a second conduit downstream of the component for conveying the working fluid away from the component;
  a first broadband acoustic sensor upstream of the component and a second broadband acoustic sensor downstream of the component, each of which are arranged to detect high-frequency and low-frequency sounds caused by the crossing of the critical point; and
  a flow regulation device configured to regulate flow of the working fluid through the component in response to the output of the first broadband acoustic sensor and/or the second broadband acoustic sensor, thereby adjusting the location of the crossing of the critical point.

A second aspect provides a system configured to utilise a working fluid in a transcritical cycle passing through the critical point, wherein the system includes a sensor assembly comprising:
  a component through which the working fluid flows, and, within a predetermined region of which the crossing of the critical point of the working fluid is desired to occur;
  a first conduit upstream of the component for conveying the working fluid to the component;
  a second conduit downstream of the component for conveying the working fluid away from the component;
  a first broadband acoustic sensor upstream of the component and a second broadband acoustic sensor downstream of the component, each of which are arranged to detect high-frequency and low-frequency sounds caused by the crossing of the critical point; and
  a flow regulation device configured to regulate flow of the working fluid through the component in response to the output of one or more of the first broadband acoustic sensor and the second broadband acoustic sensor, thereby adjusting the location of the crossing of the critical point.

A third aspect provides a method of controlling a system utilising a working fluid in a transcritical cycle passing through the critical point, the method comprising:
  selecting a predetermined region within a component, within which the crossing of the critical point is desired to occur;
  detecting high-frequency sounds and low-frequency sounds, the generation of which high-frequency sounds and low-frequency sounds being caused by the crossing of the critical point;
  regulating flow of the working fluid through the component in response to a location at which the high-frequency and low-frequency sounds were detected, thereby adjusting the location of the crossing of the critical point.

DESCRIPTION OF THE DRAWINGS

Embodiments will now be described by way of example only with reference to the accompanying drawings, which are purely schematic and not to scale, and in which.

DETAILED DESCRIPTION

Figure 1:
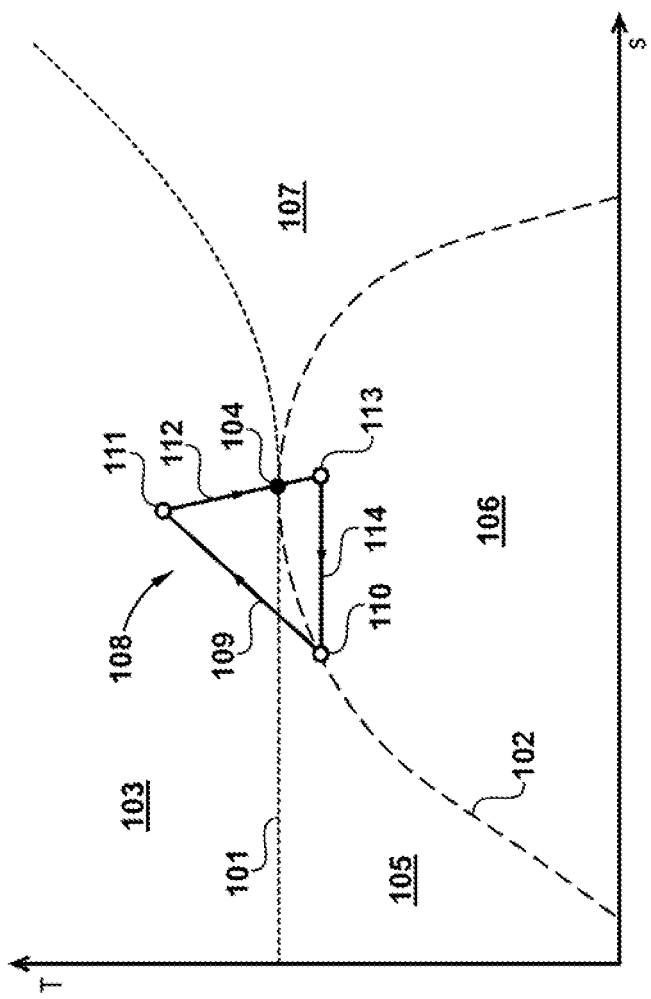
FIG. 1 is a T-s diagram showing the principle of operation for crossing the critical point.

FIG. 1 is a phase diagram, in which temperature (T) is plotted on the y-axis and entropy (s) is plotted on the x-axis. Hence, FIG. 1 is a T-s diagram. The T-s diagram of FIG. 1 is generic for a supercritical working fluid such as $sCO_2$ and shows the principle of operation for crossing the critical point.

In a first region 103, above a first dashed line 101, the fluid exists as a supercritical fluid. The first dashed line 101 meets the y-axis at a temperature away from the origin of the T-s diagram.

A second dashed line 102 extends between two points where it meets the x-axis. Between the two points, the second dashed line 102 meets the first dashed line 101 at a single point 104, which is the critical point.

In a second region 105, below the first dashed line 101 and above the second dashed line 102 and to the left of the critical point 104, the fluid exists as a sub-critical liquid.

In a third region 106, between the x-axis and the second dashed line 102, the fluid exists in a subcritical phase containing a mixture of vapour and liquid. This phase may be termed the vapour-liquid phase.

In a fourth region 107, below the first dashed line 101 and above the second dashed line 102 and to the right of the critical point 104, the fluid exists as a sub-critical vapour.

A transcritical cycle 108 passing through the critical point 104, from supercritical fluid (the first region 103) through the critical point 104 to sub-critical vapour (the third region 106), is illustrated in FIG. 1. A system may utilise a working fluid that undergoes the transcritical cycle 108.

As used herein the term transcritical cycle refers to a thermodynamic cycle, which, when plotted on a temperature-entropy phase diagram for the working fluid in question, passes through (i.e. crosses) the critical point. The transcritical cycle may pass from supercritical fluid through the critical point to sub-critical vapour.

In a first portion 109 of the transcritical cycle 108, a pump or compressor may be used to increase the temperature and the entropy of the working fluid such that it goes from a point 110 on the second dashed line 102 to a point 111 in the first region 103. At this stage in the transcritical cycle 108, the working fluid exists as a supercritical fluid.

In a second portion 112 of the transcritical cycle 108, the working fluid may pass through a flow regulating device, for example a control valve, or more specifically an expansion valve, thereby reducing the temperature and increasing the entropy of the working fluid such that it goes from the point 111 to a point 113 in the third region 106. Thus, in the second portion of the transcritical cycle 108, the working fluid goes from existing as a supercritical fluid to existing in the vapour-liquid phase. The flow regulating device is controlled to ensure that the working fluid crosses the critical point 104 (i.e. passes through the critical point) in the second portion 112 of the transcritical cycle 108.

In a third portion 114 of the transcritical cycle 108, the working fluid passes from the point 113 in the third region 106 to the point 110 on the second dashed line 102. At a corresponding point in the system, compressor heat may be rejected into a heat sink.

Figure 2:
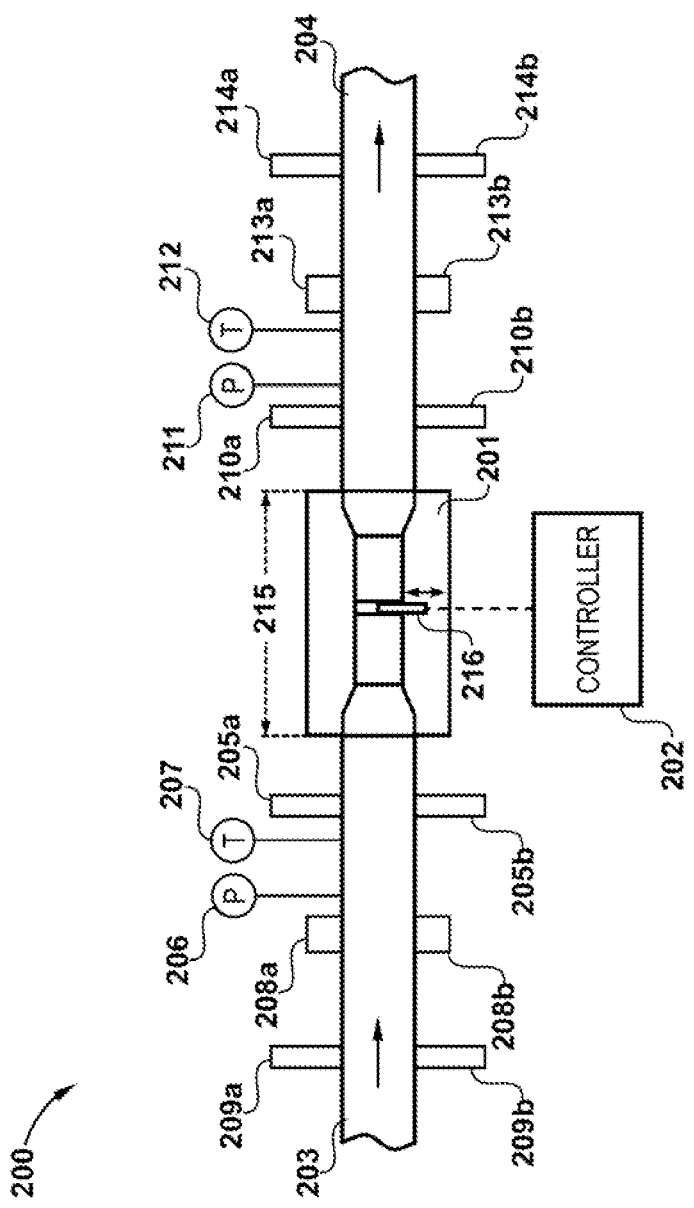
FIG. 2 shows a sensor assembly for sensing a crossing of the critical point in a system utilising a working fluid in a transcritical cycle.

FIG. 2 shows a sensor assembly 200 for sensing a crossing of the critical point in a system utilising a working fluid in a transcritical cycle passing through the critical point, from supercritical fluid through the critical point to sub-critical vapour.

A control valve 201, in this example a controllable expansion valve, is operably connected to a controller 202. Together, the control valve 201 and controller 202 form a flow regulation device. The controller 202 is arranged to control the flow of a working fluid through the control valve 201. In the present embodiment, this is achieved by adjusting the position of a movable shutter 216, to make the control valve 201 more or less open. It will be appreciated that any other variable area system may be used. The controller 202 is arranged to receive signals from a plurality of sensors, as described below, and controls operation of the valve depending upon the signal received, in order to adjust the location of the crossing of the critical point.

A first conduit 203 is arranged to convey the working fluid to the control valve 201. The first conduit 203 is upstream of the control valve 201.

A second conduit 204 is arranged to convey the working fluid away from the control valve 201. The second conduit 204 is downstream of the control valve 201.

Relatively close to the control valve 201, a first pair of upstream high-frequency microphones 205a, 205b are coupled to an outer surface of the first conduit 203. One of the first pair of upstream high-frequency microphones 205a is coupled to a top of the first conduit 203. The other of the first pair of upstream high-frequency microphones 205b is coupled to a bottom of the first conduit 203. The first pair of upstream high-frequency microphones 205a, 205b is arranged to detect high-frequency sounds from within the first conduit 203 and/or the control valve 201, the high-frequency sounds being caused by the working fluid crossing the critical point.

A distance in an upstream direction from the first pair of upstream high-frequency microphones 205a, 205b, a second pair of upstream high-frequency microphones 209a, 209b are coupled to the outer surface of the first conduit 203. One of the second pair of upstream high-frequency microphones 209a is coupled to the top of the first conduit 203. The other of the second pair of upstream high-frequency microphones 209b is coupled to the bottom of the first conduit 203. The second pair of upstream high-frequency microphones 209a, 209b is arranged to detect high-frequency sounds from within the first conduit 203 and/or the control valve 201, the high-frequency sounds being caused by the working fluid crossing the critical point.

At a location between the first pair of upstream high-frequency microphones 205a, 205b and the second pair of upstream high-frequency microphones 209a, 209b, there is a pair of upstream low-frequency microphones 208a, 208b. The pair of upstream low-frequency microphones 208a, 208b are coupled to the outer surface of the first conduit 203.

One of the pair of upstream low-frequency microphones 208a is coupled to the top of the first conduit 203. The other of the pair of upstream low-frequency microphones 208b is coupled to the bottom of the first conduit 203. The pair of upstream low-frequency microphones 208a, 208b is arranged to detect low-frequency sounds from within the first conduit 203 and/or the control valve 201, the low-frequency sounds being caused by the working fluid crossing the critical point.

Considered together, the first pair of upstream high-frequency microphones 205a, 205b, the second pair of upstream high-frequency microphones 209a, 209b and the pair of upstream low-frequency microphones 208a, 208b may be considered a first broadband acoustic sensor.

As used herein, the term "high-frequency" means a frequency greater than a frequency referred to as "low-frequency". These frequencies are dependent upon the particular configuration of the apparatus and thus it will be appreciated that it is this difference that is of relevance, not the specific frequencies or ranges of frequencies.

As used herein, the term "broadband acoustic sensor" refers to any sensor or combination of sensors that is configured to detect both the high-frequency and the low-frequency sounds.

A first pressure sensor 206 and a first temperature sensor 207 are arranged to measure the pressure and temperature of the working fluid flowing within the first conduit 203.

The controller 202 is arranged to receive signals from the first pair of upstream high-frequency microphones 205a, 205b, the second pair of upstream high-frequency microphones 209a, 209b, the pair of upstream low-frequency microphones 208a, 208b, the first pressure sensor 206 and the first temperature sensor 207.

Relatively close to the control valve 201, a first pair of downstream high-frequency microphones 210a, 210b are coupled to an outer surface of the second conduit 204. One of the first pair of downstream high-frequency microphones 210a is coupled to a top of the second conduit 204. The other of the first pair of downstream high-frequency microphones 210b is coupled to a bottom of the second conduit 204. The first pair of downstream high-frequency microphones 210a, 210b is arranged to detect high-frequency sounds from within the second conduit 204 and/or the control valve 201, the high-frequency sounds being caused by the working fluid crossing the critical point.

A distance in a downstream direction from the first pair of downstream high-frequency microphones 210a, 210b, a second pair of downstream high-frequency microphones 214a, 214b are coupled to the outer surface of the second conduit 204. One of the second pair of downstream high-frequency microphones 214a is coupled to the top of the second conduit 204. The other of the second pair of downstream high-frequency microphones 214b is coupled to the bottom of the second conduit 204. The second pair of downstream high-frequency microphones 214a, 214b is arranged to detect high-frequency sounds from within the second conduit 204 and/or the control valve 201, the high-frequency sounds being caused by the working fluid crossing the critical point.

At a location between the first pair of downstream high-frequency microphones 210a, 210b and the second pair of downstream high-frequency microphones 214a, 214b, there is a pair of downstream low-frequency microphones 213a, 213b. The pair of low-frequency microphones 213a, 213b are coupled to the outer surface of the second conduit 204. One of the pair of downstream low-frequency microphones 213a is coupled to the top of the second conduit 204. The other of the pair of downstream low-frequency microphones 213b is coupled to the bottom of the second conduit 204. The pair of downstream low-frequency microphones 213a, 213b is arranged to detect low-frequency sounds from within the second conduit 204 and/or the control valve 201, the low-frequency sounds being caused by the working fluid crossing the critical point.

Considered together, the first pair of downstream high-frequency microphones 210a, 210b, the second pair of downstream high-frequency microphones 214a, 214b and the pair of downstream low-frequency microphones 213a, 213b may be considered a second broadband acoustic sensor.

A second pressure sensor 211 and a second temperature sensor 212 are arranged to measure the pressure and temperature of the working fluid flowing within the second conduit 204.

The controller 202 is arranged to receive signals from the first pair of downstream high-frequency microphones 210a, 210b, the second pair of downstream high-frequency microphones 214a, 214b, the pair of downstream low-frequency microphones 213a, 213b, the second pressure sensor 211 and the second temperature sensor 212.

A predetermined region 215 within which the crossing of the critical point of the working fluid is desired to occur is located between the first pair of upstream high-frequency microphones 205a, 205b and the first pair of downstream high-frequency microphones 210a, 210b.

In response to signals received from the first broadband acoustic sensor and the second broadband acoustic sensor, the controller 202 is arranged to control operation of the control valve 201 so as to regulate flow of the working fluid therethrough, thereby adjusting the location of the crossing of the critical point. At any given time, the controller 202 controls operation of the control valve 201 such that the crossing of the critical point occurs within the predetermined region 215.

Controlling the crossing of the critical point such that it occurs in a predetermined region of the component may enable the beneficial thermodynamic properties of a supercritical working fluid to be exploited, without seeking to hold the working fluid at the critical point in other parts of the system. It has been found to be not possible to hold the working fluid at the critical point.

Without wishing to be bound by any particular theory, the sound(s) sensed by the first broadband acoustic sensor and the second broadband acoustic sensor when the working fluid is at or near the critical point may be a resonance comprising a mixture of high frequencies and low frequencies. The resonance detected is not the working fluid; rather, it is the effect of the fluid resonance on the body of the component and/or the first conduit and/or the second conduit.

It has been observed that the critical point crossing results in a distinctive acoustic phenomenon not observed anywhere else in the pressure-temperature regions. The distinctive acoustic phenomenon is in the form of an intense vibration, with an audible high-pitched element and a low-frequency element. This resonance is detected by the broadband acoustic sensors as initially a standing wave and then a low-frequency "pinging", back and forth along the length of the pipework, e.g. the first conduit and/or the second conduit.

This distinctive acoustic phenomenon is unexpected, and only occurred during testing when crossing the critical point. It is thought to be a consequence of the sudden drop in the speed of sound (to less than 30 m/s in carbon dioxide) at the critical point. The sides of the valve may cause shock waves to occur as the fluid crosses the critical point and in-phase molecular vibration occurs.

The first broadband acoustic sensor may comprise one or more low-frequency microphone and one or more high-frequency microphone.

The second broadband acoustic sensor may comprise one or more low-frequency microphone and one or more high-frequency microphone.

In some implementations, the sensor assembly may not include a second upstream pair of high-frequency microphones and/or a second downstream pair of high-frequency microphones.

It will be appreciated that the high-frequency microphones and the low-frequency microphones may be considered examples of suitable acoustic sensors. Other acoustic sensors may be employed. The acoustic sensors need not be arranged in pairs, for example they may be arranged singularly or as triplets, or in greater numbers. Other arrangements of acoustic sensors may be employed comprising one or more acoustic sensors in any suitable arrangement.

In some implementations, the sensor assembly may not include any temperature sensors or pressure sensors.

In the sensor assembly 200 illustrated in FIG. 2, the second pair of upstream high-frequency microphones 209*a*, 209*b* operate to pick up high frequencies in the body of the first conduit 203 that travel backwards from the critical point crossing. As noted elsewhere herein, and without wishing to be bound by any theory, the resonance detected is not the fluid; rather, it is the effect of the fluid resonance on the body of the first conduit 203. Knowing the distance and conditions in the system pipework, e.g. the first conduit 203, the location of the critical point crossing can be determined in the longitudinal direction by timing the resonance picked up by the second pair of upstream high-frequency microphones 209*a*, 209*b* and using other acoustic sensors to calculate distance.

The pair of upstream low-frequency microphones 208*a*, 208*b* operate to sense the critical point crossing or nearing. When a low-frequency is detected in the first conduit 203, the position of the control valve 201 may be held, with fine tuning changing the high-frequency response. The low-frequency that results from a shock (the critical point crossing) occurs at a further distance from the source. Hence, the pair of upstream low-frequency microphones 208*a*, 208*b* are located further upstream of the predetermined region 215 than the first pair of upstream high-frequency microphones 205*a*, 205*b*. Likewise, the pair of downstream low-frequency microphones 213*a*, 213*b* are located further downstream of the predetermined region 215 than the first pair of downstream high-frequency microphones 210*a*, 210*b*.

The first pair of upstream high-frequency microphones 205*a*, 205*b* constitute a ranging high-frequency sensor operable to detect high-frequency resonation in the first conduit 203. The first pair of upstream high-frequency microphones 205*a*, 205*b* are located upstream of the predetermined region 215.

The first pair of downstream high-frequency microphones 210*a*, 210*b* constitute a ranging high-frequency sensor operable to detect high-frequency resonation in the second conduit 204. The first pair of downstream high-frequency microphones 210*a*, 210*b* are located downstream of the predetermined region 215.

The pair of downstream low-frequency microphones 213*a*, 213*b* operate to sense the critical point crossing or nearing. When a low-frequency is detected in the second conduit 204, the position of the control valve 201 may be held, with fine tuning changing the high-frequency response.

The second pair of downstream high-frequency microphones 214*a*, 214*b* operate to pick up high frequencies in the body of the second conduit 204 that travel forwards from the critical point crossing.

Figure 3:
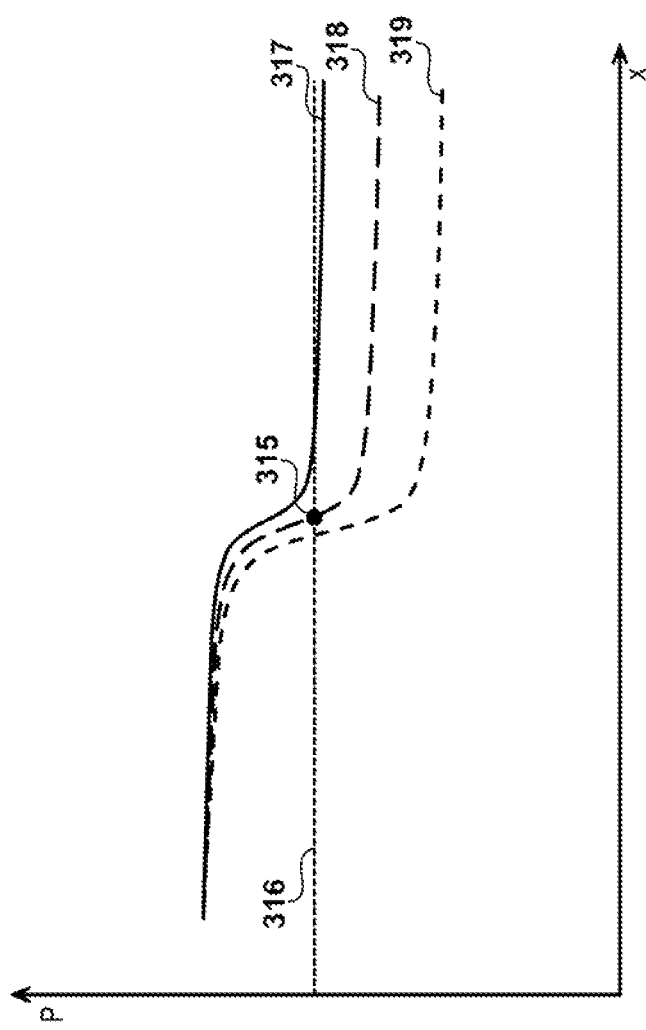
FIG. 3 is a graph of pressure on the y-axis as a function of position on the x-axis for the sensor assembly of FIG. 2.

FIG. 3 is a graph of pressure (P) on the y-axis as a function of position (x) on the x-axis for the sensor assembly 200.

A first dashed line 316 extending horizontally across the graph indicates the critical pressure (Pcrit) for the working fluid.

A desired position for the crossing of the critical pressure is indicated by a blob 315. Referring back to FIG. 2, it will be appreciated that the desired position for the crossing of the critical pressure will be within the predetermined region 215.

A first line 317 shows the variation of pressure with position with the control valve 201 in an open position.

A second line 318 shows the variation of pressure with position with the control valve 201 in an intermediate position, which may be termed a throttled position.

A third line 319 shows the variation of pressure with position with the control valve 201 in a choked position (i.e. relatively closed).

In the illustrated example, the pressure drop across the control valve 201 is smallest for the first line 317 and largest for the third line 319. The pressure drop across the control valve 201 for the second line 318 is larger than that for the first line 317 and smaller than that for the third line 319.

The second line 318 passes through the blob 315. Accordingly, in the illustrated example, the second line 318 corresponds with the control valve 201 being in the correct position to ensure that the crossing of the critical pressure occurs within the predetermined region 215.

If, at any given time, the control valve 201 is too open, then the crossing of the critical pressure will occur downstream of the desired position.

If, at any given time, the control valve 201 is not open enough, then the crossing of the critical pressure will occur upstream of the desired position.

Figure 4:
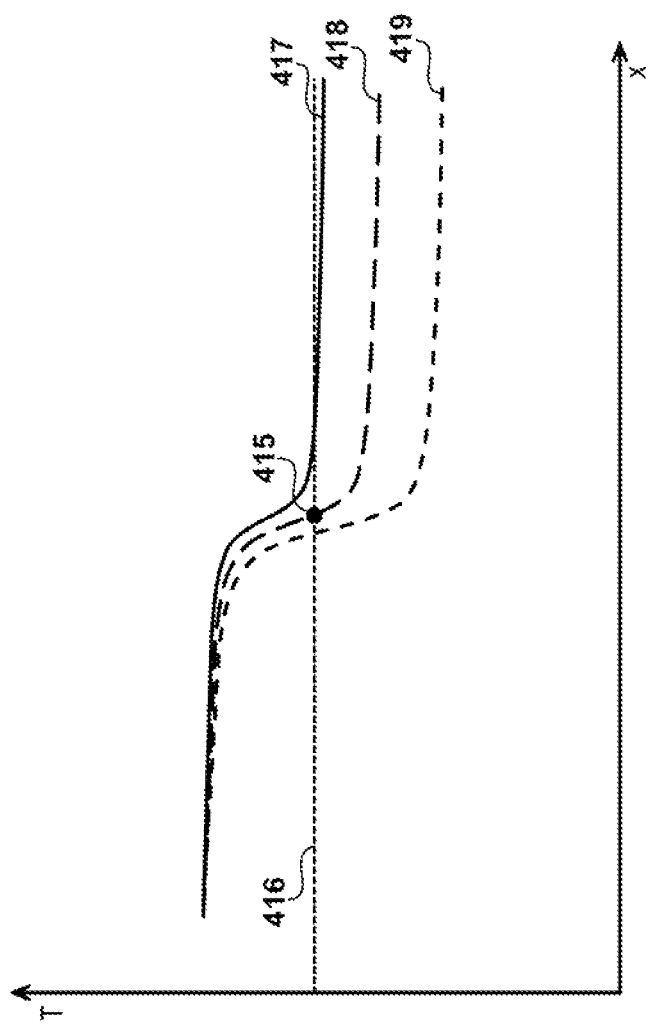
FIG. 4 is a graph of temperature on the y-axis as a function of position on the x-axis for the sensor assembly of FIG. 2.

FIG. 4 is a graph of temperature (T) on the y-axis as a function of position (x) on the x-axis for the sensor assembly 200.

A first dashed line 416 extending horizontally across the graph indicates the critical temperature (Tcrit) for the working fluid.

A desired position for the crossing of the critical temperature is indicated by a blob 415. Referring back to FIG. 2, it will be appreciated that the desired position for the crossing of the critical temperature will be within the predetermined region 215.

A first line 417 shows the variation of temperature with position with the control valve 201 in an open position.

A second line 418 shows the variation of temperature with position with the control valve 201 in an intermediate position, which may be termed a throttled position.

A third line 419 shows the variation of temperature with position with the control valve 201 in a choked position (i.e. relatively closed).

In the illustrated example, the temperature drop across the control valve 201 is smallest for the first line 417 and largest for the third line 419. The temperature drop across the control valve 201 for the second line 418 is larger than that for the first line 417 and smaller than that for the third line 419.

The second line 418 passes through the blob 415. Accordingly, in the illustrated example, the second line 418 corresponds with the control valve 201 being in the correct position to ensure that the crossing of the critical temperature occurs within the predetermined region 215.

If, at any given time, the control valve 201 is too open, then the crossing of the critical temperature will occur downstream of the desired position.

If, at any given time, the control valve 201 is not open enough, then the crossing of the critical temperature will occur upstream of the desired position.

Figure 5:
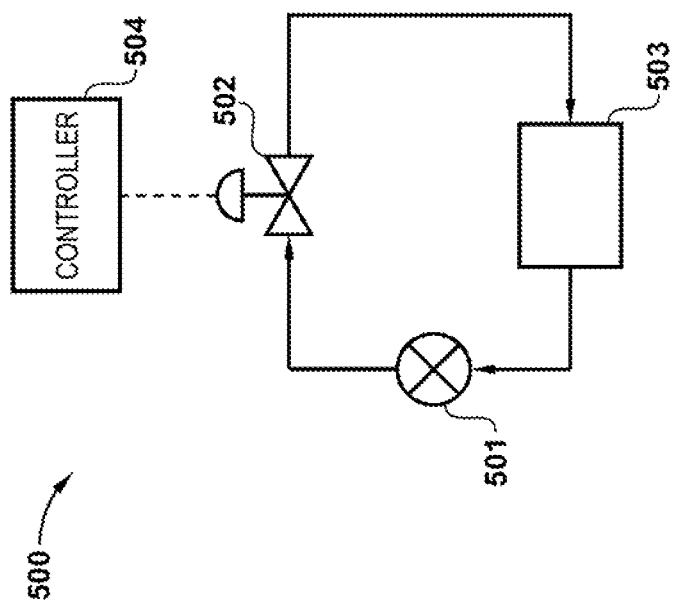
FIG. 5 illustrates schematically a system arranged to utilise a working fluid in the transcritical cycle shown in FIG. 1.

FIG. 5 illustrates schematically a system 500 arranged to utilise a working fluid in the transcritical cycle 108 shown in FIG. 1.

A pump or compressor 501 is operable to increase the temperature and the entropy of the working fluid such that it goes from the point 110 (FIG. 1) on the second dashed line 102 (FIG. 1) to the point 111 (FIG. 1) in the first region 103 (FIG. 1). At this stage in the transcritical cycle 108 (FIG. 1), the working fluid exists as a supercritical fluid.

A control valve 502 is located downstream of, and in fluid communication with, the pump or compressor 501. As with the embodiment described with reference to FIG. 2, the control valve 502 may be a controllable expansion valve. As a result of passing through the expansion valve, the temperature of the working fluid is reduced and the entropy of the working fluid is increased such that it goes from the point 111 (FIG. 1) to the point 113 (FIG. 1) in the third region 106 (FIG. 1). Thus, the working fluid goes from existing as a supercritical fluid to existing in the vapour-liquid phase. The expansion valve 502 is controlled to ensure that the working fluid crosses the critical point 104 (i.e. passes through the critical point) within a predetermined region of a component (not shown) of the expansion valve 502.

A heat exchanger 503 is located downstream of, and in fluid communication with, the expansion valve 502. In the heat exchanger, compressor heat is rejected from the working fluid into a heat sink. In this part of the transcritical cycle 108, the working fluid passes from the point 113 (FIG. 1) in the third region 106 (FIG. 1) to the point 110 (FIG. 1) on the second dashed line 102 (FIG. 1).

Working fluid exiting the heat exchanger 503 is then conveyed to the pump or compressor 501 and the transcritical cycle 108 is repeated.

A controller 504 is operably connected to the expansion valve 502, thereby forming a flow regulation device.

The system 500 includes a sensor assembly (not shown). The sensor assembly may be similar to or the same as the sensor assembly 200 shown in FIG. 2.

The sensor assembly is configured to sense the crossing of the critical point in the system 500, which utilises a working fluid in a transcritical cycle passing through the critical point, from supercritical fluid through the critical point to sub-critical vapour.

The sensor assembly comprises: a first broadband acoustic sensor upstream of the expansion valve 502; a second broadband acoustic sensor downstream of the expansion valve 502; wherein the first broadband acoustic sensor and the second broadband acoustic sensor are each arranged to detect high-frequency and low-frequency sounds from within the expansion valve 502 and/or a first conduit for conveying the working fluid to the component and/or a second conduit for conveying the working fluid away from the component, generation of the high-frequency and low-frequency sounds being caused by the crossing of the critical point.

The controller is arranged to: receive a signal from the first broadband acoustic sensor and the second broadband acoustic sensor, the signals being generated in response to the first broadband acoustic sensor detecting high-frequency and low-frequency sounds from within the expansion valve 502 and/or the first conduit and/or the second conduit and/or the second broadband acoustic sensor detecting high-frequency and low-frequency sounds from within the expansion valve 502 and/or the first conduit and/or the second conduit; and to control operation of the expansion valve 502 so as to regulate flow of the working fluid, thereby adjusting the location of the crossing of the critical point.

In this illustrated example implementation, it will be appreciated that the crossing of the critical point is desired to occur within a predetermined region within or in the vicinity of the expansion valve 502.

In other implementations, it will be appreciated that the crossing of the critical point may be desired to occur within or in the vicinity of another component, which may include, for example, a heat exchanger or a portion of pipe.

In one implementation, the system 500 may include a heat exchanger in place of the expansion valve 502. In the heat exchanger, the working fluid may be brought into a heat exchanging relationship with a hot fluid stream, e.g. an exhaust stream from an engine or a power plant. The engine or the power plant may comprise a gas turbine engine. The location of the crossing of the critical point may be controlled so that it occurs within a predetermined region of the heat exchanger, e.g. when the working fluid is in the heat exchanging relationship with the hot fluid stream. Consequently, the beneficial thermodynamic properties at the critical point of the working fluid may be utilised at the point in the system where they are of most benefit, e.g. when the working fluid is in the heat exchanging relationship with the hot fluid stream. In implementations where the component comprises a heat exchanger, it may be possible to utilise a more compact heat exchanger than in a system that does not utilise a working fluid in a transcritical cycle.

Figure 6:
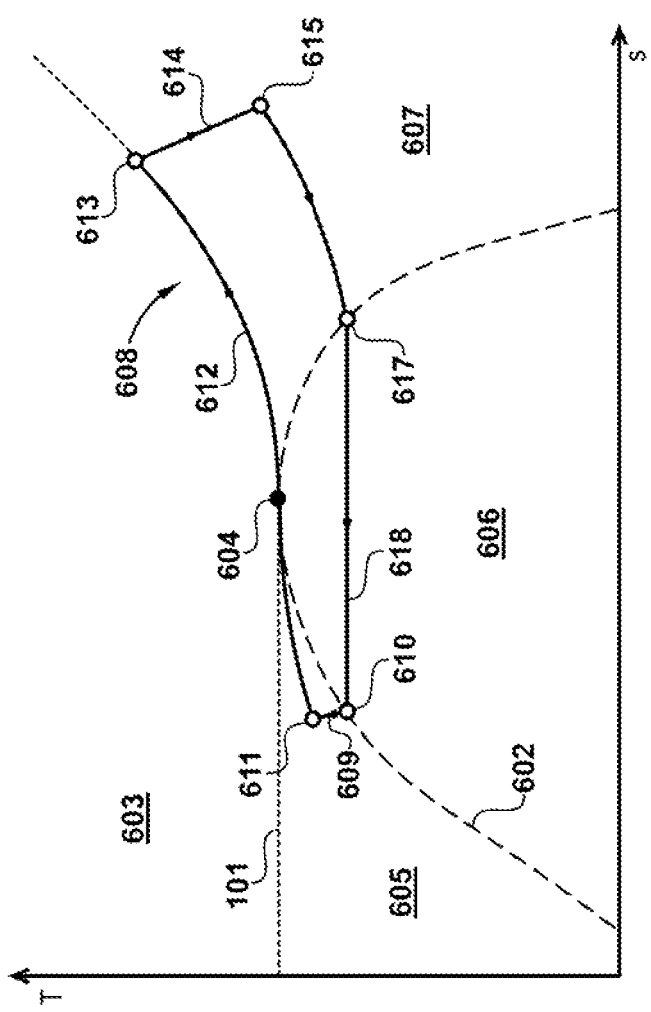
FIG. 6 is a T-s diagram showing the principle of operation for crossing the critical point in another transcritical cycle.

FIG. 6 is a T-s diagram showing the principle of operation for crossing the critical point in another transcritical cycle. In this case, the transcritical cycle is a power cycle. Temperature (T) is plotted on the y-axis and entropy (s) is plotted on the x-axis. The T-s diagram of FIG. 6 is generic for a supercritical working fluid such as $sCO_2$ and shows the principle of operation for crossing the critical point.

In a first region 603, above a first dashed line 601, the fluid exists as a supercritical fluid. The first dashed line 601 meets the y-axis at a temperature away from the origin of the T-s diagram.

A second dashed line 602 extends between two points where it meets the x-axis. Between the two points, the second dashed line 602 meets the first dashed line 601 at a single point 604, which is the critical point.

In a second region 605, below the first dashed line 601 and above the second dashed line 602 and to the left of the critical point 604, the fluid exists as a sub-critical liquid.

In a third region 606, between the x-axis and the second dashed line 602, the fluid exists in a subcritical phase containing a mixture of vapour and liquid. This phase may be termed the vapour-liquid phase.

In a fourth region 607, below the first dashed line 601 and above the second dashed line 602 and to the right of the critical point 604, the fluid exists as a sub-critical vapour.

A transcritical cycle 608 passing through the critical point 604 is illustrated in FIG. 6. A system may utilise a working fluid that undergoes the transcritical cycle 608.

In a first portion 609 of the transcritical cycle 608, a pump may be used to increase the temperature of the working fluid such that it goes from a first point 610 on the second dashed line 602 to a point 611 in the second region 605. At this stage in the transcritical cycle 608, the working fluid exists as a sub-critical liquid.

In a second portion 612 of the transcritical cycle 608, the temperature and entropy of the fluid increase in such a way that the critical point 604 is crossed as the working fluid goes from the point 611 in the second region 605 to a first point 613 in the first region 603. At this stage in the transcritical cycle 608, the working fluid exists as a supercritical fluid.

In the second portion 612 of the transcritical cycle 608, the working fluid may be passed through a heat exchanger, in which the working fluid is brought into a heat exchanging relationship with a hot fluid stream such as an exhaust stream from an engine, e.g. a gas turbine engine. Accordingly, heat is transferred from the hot fluid stream to the working fluid. A sensor assembly according to the present disclosure may be employed to ensure that the crossing of the critical point 604 occurs at a desired location, i.e. within a predetermined region in the heat exchanger.

In a third portion 614 of the transcritical cycle 608, the working fluid moves from the first point 613 in the first region 601 to a second point 615 in the first region 601. At the second point 615 in the first region 601, the fluid has a lower temperature and a higher entropy than at the first point 613. At this point in the transcritical cycle, the working fluid exists as a supercritical fluid. This may be achieved by the working fluid passing through a turbine.

In a fourth portion 616 of the transcritical cycle 608, the temperature and entropy of the working fluid decrease. The working fluid passes from the second point 615 in the first region 601, through the fourth region 607 to a second point 617 on the second dashed line 602. In the fourth portion 616 of the transcritical cycle 608, the working fluid goes from being a supercritical fluid to a sub-critical vapour.

In a fifth portion 618 of the transcritical cycle 608, the working fluid passes from the second point 617 on the second dashed line 602 through the third region 606 to the first point 610 on the second dashed line 602. At a corresponding point in the system, heat may be rejected into a heat sink.

Figure 7:
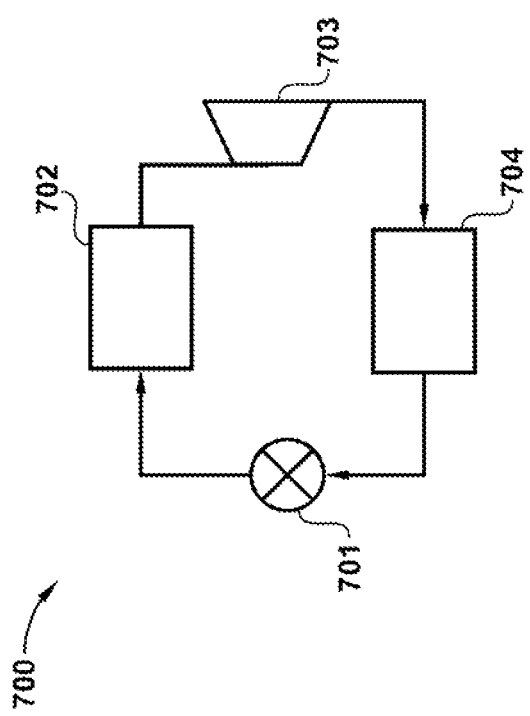
FIG. 7 illustrates schematically a system arranged to utilise a working fluid in the transcritical cycle shown in FIG. 6.

FIG. 7 illustrates schematically a system 700 arranged to utilise a working fluid in the transcritical cycle 608 shown in FIG. 6.

A pump 701 is operable to increase the temperature and the entropy of the working fluid such that it goes from the first point 610 (FIG. 1) on the second dashed line 602 (FIG. 1) to the point 611 (FIG. 1) in the second region 605 (FIG. 1). At this stage in the transcritical cycle 108 (FIG. 1), the working fluid exists as a sub-critical liquid.

A first heat exchanger 702 is located downstream of, and in fluid communication with, the pump 701. In the first heat exchanger 702, the working fluid is brought into a heat exchanging relationship with a hot fluid stream such as an exhaust stream from an engine, e.g. a gas turbine engine. As a result of passing through the first heat exchanger, the temperature of the working fluid is increased and the entropy of the working fluid is increased such that it goes from the point 611 (FIG. 1) to the point 613 (FIG. 1) in the first region 603 (FIG. 1). Thus, the working fluid goes from existing as a sub-critical liquid to as a supercritical fluid. Fluid flow through the first heat exchanger 702 is controlled to ensure that the working fluid crosses the critical point 604 (i.e. passes through the critical point) within a predetermined region of the first heat exchanger 702.

A turbine 703 is located downstream of, and in fluid communication with, the first heat exchanger 702. An output from the turbine may be used to drive an associated system, e.g. a generator.

A second heat exchanger 704 is located downstream of, and in fluid communication with, the turbine 703. In the second heat exchanger 704, heat is rejected from the working fluid into a heat sink. In this part of the transcritical cycle 608, the working fluid passes from the second point 617 (FIG. 1) on the second dashed line 602 (FIG. 1) in the third region 606 (FIG. 1) to the first point 610 (FIG. 1) on the second dashed line 602 (FIG. 1).

Working fluid exiting the second heat exchanger 704 is then conveyed to the pump 701 and the transcritical cycle 608 is repeated.

A controller (not shown) is operably connected to a valve (not shown) arranged to regulate flow of the working fluid through the first heat exchanger 702.

The system 700 includes a sensor assembly (not shown) corresponding to those previously described with reference to FIGS. 2 and 5.

The sensor assembly is configured to sense the crossing of the critical point in the system 700, which utilises a working fluid in a transcritical cycle passing through the critical point.

The sensor assembly comprises: a first broadband acoustic sensor upstream of the first heat exchanger 702; a second broadband acoustic sensor downstream of the first heat exchanger 702; wherein the first broadband acoustic sensor and the second broadband acoustic sensor are each arranged to detect high-frequency and low-frequency sounds from within the first heat exchanger 702 and/or a first conduit for conveying the working fluid to the component and/or a second conduit for conveying the working fluid away from the component, generation of the high-frequency and low-frequency sounds being caused by the crossing of the critical point.

In the present embodiment, the controller is arranged to: receive a signal from the first broadband acoustic sensor and the second broadband acoustic sensor, the signals being generated in response to the first broadband acoustic sensor detecting high-frequency and low-frequency sounds from within the first heat exchanger 702 and/or the first conduit and/or the second conduit and/or the second broadband acoustic sensor detecting high-frequency and low-frequency sounds from within the first heat exchanger 702 and/or the first conduit and/or the second conduit; and to control operation of the valve so as to regulate flow of the working fluid through the first heat exchanger 702, thereby adjusting the location of the crossing of the critical point.

In this illustrated example implementation, it will be appreciated that the crossing of the critical point is desired to occur within a predetermined region within or in the vicinity of the first heat exchanger 702.

Figure 8:
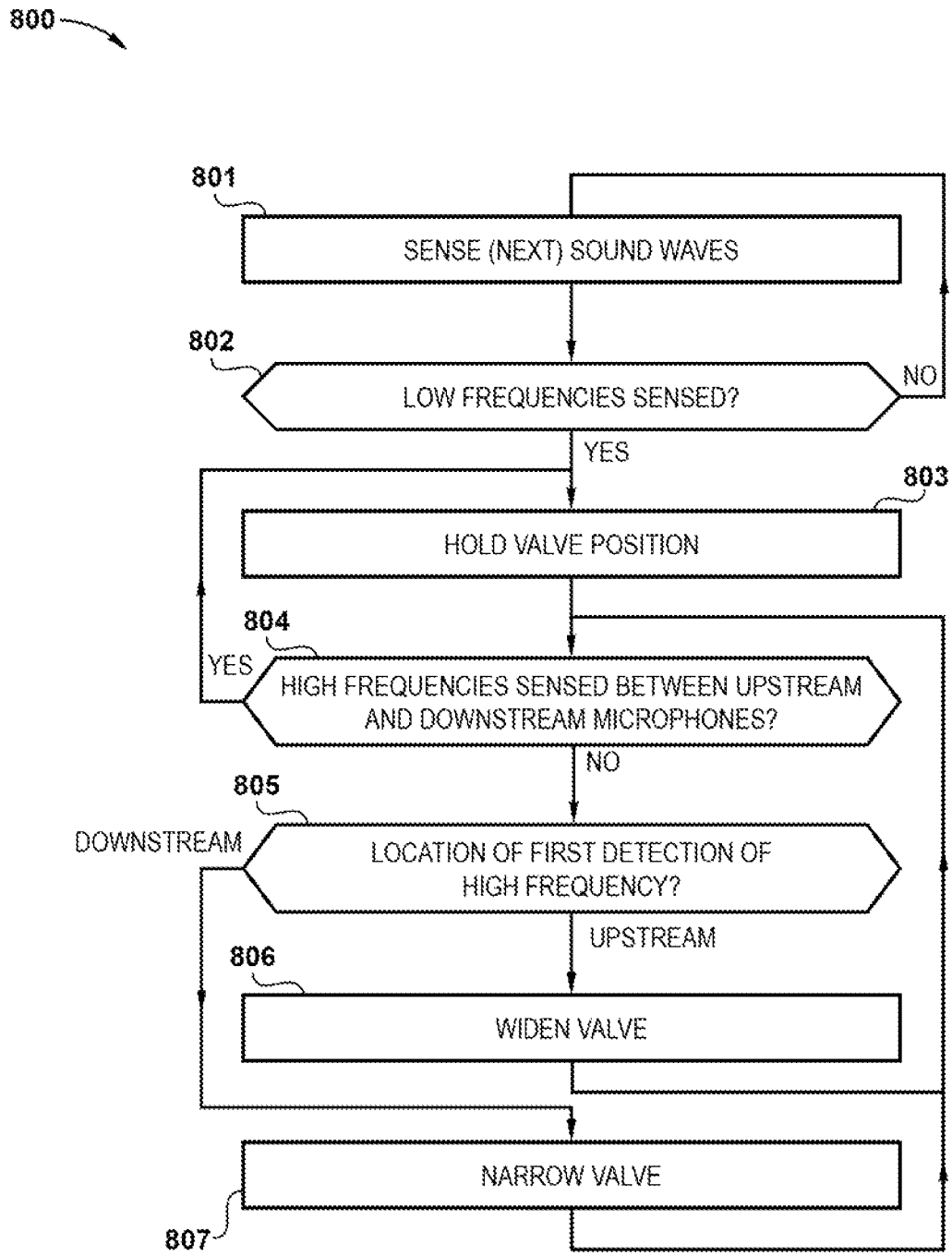
FIG. 8 illustrates a method of operation of the sensor assembly shown in FIG. 2.

FIG. 8 illustrates an example method of operation of the sensor assembly 200.

In a first step 801, one or more sound waves are sensed.

In a second step 802, a decision is made depending upon the sensed sound wave(s). If a low-frequency sound is heard by the pair of upstream low-frequency microphones 208a, 208b and/or the pair of downstream low-frequency microphones 213a, 213b, then the method proceeds to a third step 803. If a low-frequency sound is not heard by the pair of upstream low-frequency microphones 208a, 208b and/or the pair of downstream low-frequency microphones 213a, 213b, then the method does not proceed to the third step 803.

In the third step 803, the position of the control valve 201 is held.

In a fourth step 804, another decision is made depending upon the sensed sound wave(s). If a high-frequency sound is heard by the first pair of upstream high-frequency microphones 205a, 205b and/or the first pair of downstream high-frequency microphones 210a, 210b, then the method loops back to the third step 803. Consequently, the position of the control valve 201 is held. If a high-frequency sound is not heard by the first pair of upstream high-frequency microphones 205a, 205b and/or the first pair of downstream high-frequency microphones 210a, 210b, then the method proceeds to a fifth step 805.

In the fifth step 805, another decision is made depending upon whether high-frequency sound waves are heard by the first pair of upstream high-frequency microphones 205a, 205b before the first pair of downstream high-frequency microphones 210a, 210b or vice versa.

If high-frequency sound waves are heard first by the first pair of upstream high-frequency microphones 205a, 205b, then the method proceeds to a sixth step 806. In the sixth step 806, the control valve 201 is moved to a more open position. The method then loops back to the fourth step 804.

If high-frequency sound waves are heard first by the first pair of downstream high-frequency microphones 210a, 210b, then the method proceeds to a seventh step 807. In the seventh step 807, the control valve 201 is moved to a less open position. The method then loops back to the fourth step 804.

It will be appreciated that the method 800 operates to adjust the crossing of the critical point such that it occurs at a location between the first pair of upstream high-frequency microphones 205a, 205b and the first pair of downstream high-frequency microphones 210a, 210b, i.e. in the predetermined region 215.

The method may further comprise the second pair of upstream high-frequency microphones 209a, 209b and/or the second pair of downstream high-frequency microphones 214a, 214b hearing one or more high-frequency sound waves and adjusting the position of the control valve 201 in dependence upon which of the second pair of upstream high-frequency microphones 209a, 209b and the second pair of downstream high-frequency microphones 214a, 214b heard the high-frequency sound wave(s) before the other of the second pair of upstream high-frequency microphones 209a, 209b and the second pair of downstream high-frequency microphones 214a, 214b. The second pair of upstream high-frequency microphones 209a, 209b and the second pair of downstream high-frequency microphones 214a, 214b may be considered ranging sensors. The signal (s) received from the second pair of upstream high-frequency microphones 209a, 209b and/or the second pair of downstream high-frequency microphones 214a, 214b may be used to provide fine tuning of the sensor assembly 200.

The sensor assembly of the present disclosure provides improved response time and reliability for controlling the crossing of the critical point in a working fluid. By using acoustic sensors response rates may be many times quicker than in systems using pressure or temperature sensors. Furthermore, the sound is only present at or very near the critical point, so it is easily distinguished.

Furthermore, the sensor assembly does not require high accuracy. It can be placed outside of a system's pipework and is therefore non-invasive, thereby reducing possible pressure vessel failure points and potentially making the system relatively small and/or light.

Moreover, the broadband acoustic sensors may be relatively cheap and/or relatively easy to maintain or replace. Broadband acoustic sensors may be added or removed in accordance with an operator's needs, while the system is pressurised or even running.

In any example disclosed herein, the working fluid may comprise, or consist essentially of, carbon dioxide. The working fluid may be carbon dioxide.

Various examples have been described, each of which comprise one or more combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. A sensor assembly for sensing a crossing of the critical point by a working fluid in a transcritical cycle, the sensor assembly comprising:
   a component through which the working fluid flows, and, within a predetermined region of which the crossing of the critical point of the working fluid is desired to occur;
   a first conduit upstream of the component for conveying the working fluid to the component;
   a second conduit downstream of the component for conveying the working fluid away from the component;
   a first broadband acoustic sensor upstream of the component and a second broadband acoustic sensor downstream of the component, each of which are arranged to detect high-frequency sounds and low-frequency sounds caused by the crossing of the critical point; and
   a flow regulation device configured to regulate flow of the working fluid through the component in response to the output of one or more of the first broadband acoustic sensor and the second broadband acoustic sensor, thereby adjusting the location of the crossing of the critical point.

2. The sensor assembly of claim 1, wherein the flow regulation device comprises a control valve and a controller for the control valve.

3. The sensor assembly of claim 2, wherein the controller is configured to control operation of the control valve so as to regulate flow of the working fluid through the component in response to signals received from one or more of the first broadband acoustic sensor and the second broadband acoustic sensor.

4. The sensor assembly of claim 3, wherein the controller is configured to maintain flow of the working fluid through the component in response to the high-frequency sounds being detected within the component by one or more of the first broadband acoustic sensor and the second broadband acoustic sensor.

5. The sensor assembly of claim 3, wherein the controller is configured to increase flow of the working fluid through the component in response to the high-frequency sounds being detected upstream of the component by one or more of the first broadband acoustic sensor and the second broadband acoustic sensor.

6. The sensor assembly of claim 3, wherein the controller is configured to decrease flow of the working fluid through the component in response to the high-frequency sounds being detected downstream of the component by one or more of the first broadband acoustic sensor and the second broadband acoustic sensor.

7. The sensor assembly of claim 1, wherein one or more of the first broadband acoustic sensor and the second broadband acoustic sensor include one or more microphones.

8. A system configured to utilise a working fluid in a transcritical cycle passing through the critical point, wherein the system includes a sensor assembly comprising:
- a component through which the working fluid flows, and, within a predetermined region of which the crossing of the critical point of the working fluid is desired to occur;
- a first conduit upstream of the component for conveying the working fluid to the component;
- a second conduit downstream of the component for conveying the working fluid away from the component;
- a first broadband acoustic sensor upstream of the component and a second broadband acoustic sensor downstream of the component, each of which are arranged to detect high-frequency and low-frequency sounds caused by the crossing of the critical point; and
- a flow regulation device configured to regulate flow of the working fluid through the component in response to the output of one or more of the first broadband acoustic sensor and the second broadband acoustic sensor, thereby adjusting the location of the crossing of the critical point.

9. The sensor assembly of claim 8, wherein the flow regulation device comprises a control valve and a controller for the control valve, which controller is configured to control operation of the control valve so as to regulate flow of the working fluid through the component in response to signals received from one or more of the first broadband acoustic sensor and the second broadband acoustic sensor.

10. The sensor assembly of claim 9, wherein the controller is configured to:
- maintain flow of the working fluid through the component in response to the high-frequency sounds being detected within the component by one or more of the first broadband acoustic sensor and the second broadband acoustic sensor;
- increase flow of the working fluid through the component in response to the high-frequency sounds being detected upstream of the component by one or more of the first broadband acoustic sensor and the second broadband acoustic sensor;
- decrease flow of the working fluid through the component in response to the high-frequency sounds being detected downstream of the component by one or more of the first broadband acoustic sensor and the second broadband acoustic sensor.

11. The system of claim 8, further comprising one or more of:
- a pump;
- a compressor;
- an expansion valve;
- a turbine;
- a heat exchanger.

12. The system of claim 8, further comprising a heat exchanger arranged to reject heat from the working fluid into a heat sink.

13. The system of claim 8, further comprising a heat exchanger arranged to bring the working fluid into a heat exchanging relationship with a hot fluid stream.

14. A method of controlling a system utilising a working fluid in a transcritical cycle passing through the critical point, the method comprising:
- selecting a predetermined region within a component, within which the crossing of the critical point is desired to occur;
- detecting high-frequency sounds and low-frequency sounds, the generation of which high-frequency sounds and low-frequency sounds being caused by the crossing of the critical point;
- regulating flow of the working fluid through the component in response to a location at which the high-frequency and low-frequency sounds were detected, thereby adjusting the location of the crossing of the critical point.

15. The method of claim 14, wherein flow of the working fluid through the component is maintained in response to the high-frequency sounds being detected in the component.

16. The method of claim 14, wherein flow of the working fluid through the component is increased in response to the high-frequency sounds being detected upstream of the component.

17. The method of claim 14, wherein flow of the working fluid through the component is reduced in response to the high-frequency and low-frequency sounds being detected downstream of the component.

* * * * *